(12) United States Patent  
Takahashi et al.

(10) Patent No.: US 7,713,050 B2  
(45) Date of Patent: *May 11, 2010

(54) DIE FOR FORMING HONEYCOMB STRUCTURE

(75) Inventors: Hironori Takahashi, Nagoya (JP); Masayuki Hironaga, Tokai (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/933,792

(22) Filed: Nov. 1, 2007

(65) Prior Publication Data

US 2008/0078920 A1 Apr. 3, 2008

Related U.S. Application Data

(63) Continuation of application No. PCT/JP2007/056147, filed on Mar. 26, 2007.

(30) Foreign Application Priority Data

Mar. 31, 2006 (JP) .............................. 2006-097139

(51) Int. Cl.  
B29C 47/20 (2006.01)
(52) U.S. Cl. .................. 425/380; 264/177.12; 425/461; 425/467
(58) Field of Classification Search .................. 425/380, 425/461, 467; 264/177.12

See application file for complete search history.

(56) References Cited

U.S. PATENT DOCUMENTS

| 4,354,820 | A | * | 10/1982 | Yamamoto et al. | ........... 425/461 |
| 4,780,075 | A | * | 10/1988 | Ozaki et al. | ................. 425/464 |
| 7,500,847 | B2 | * | 3/2009 | Takahashi et al. | ........... 425/380 |
| 2006/0034972 | A1 | | 2/2006 | Takahashi et al. | |

FOREIGN PATENT DOCUMENTS

| JP | A 2003-285308 | 10/2003 |
| JP | A 2006-051682 | 2/2006 |
| JP | A 2000-326318 | 11/2006 |

* cited by examiner

*Primary Examiner*—Robert B Davis  
*Assistant Examiner*—Joseph Leyson  
(74) *Attorney, Agent, or Firm*—Oliff & Berridge, PLC

(57) ABSTRACT

A die for forming a honeycomb structure includes a die base having a first plate-like member and a second plate-like member, the first plate-like member is provided with groove portions on the side of a bonding surface between the first plate-like member and the second plate-like member, and a depth y (mm) of the groove portions satisfies:

$$y \leq a \cdot (t1 \times E1 + t2 \times E2)/(t1 \times t2 \times E1 \times E2)$$

where t1 is a thickness (mm) obtained by subtracting the depth (mm) of the groove portions from a thickness (mm) of the first plate-like member, E1 is an apparent volume elasticity (GPa) of the first plate-like member at 25° C. in consideration of a state in which back holes are formed, t2 is a thickness (mm) of the second plate-like member, E2 is a volume elasticity (GPa) of the second plate-like member at 25° C., and a is a coefficient determined based on conditions during manufacturing.

3 Claims, 3 Drawing Sheets

DIE FOR FORMING HONEYCOMB STRUCTURE

TECHNICAL FIELD

The present invention relates to a die for forming a honeycomb structure and a method for manufacturing the same. More particularly, it relates to a die for forming a honeycomb structure which is capable of precisely forming the honeycomb structure, and a method for manufacturing the same.

BACKGROUND ART

As a method for manufacturing a ceramic honeycomb structure, an extrusion method has heretofore broadly been performed by using a die for forming a honeycomb structure (hereinafter referred to simply as the "die" sometimes) including a die base which is provided with back holes for introducing a forming material (clay) and lattice-like slits or the like for communicating with these back holes. In this die, one surface of the die base is usually provided with the lattice-like slits each having a width corresponding to a partition wall thickness of the honeycomb structure, and the opposite surface (the other surface) thereof is provided with the back holes which communicate with the slits and which have large opening areas. Moreover, the back holes are usually arranged at positions where the lattice-like slits intersect with one another, and the back holes and the slits communicate with each other in the die base. Therefore, a forming material such as a ceramic material introduced from the back holes moves from the back holes having a comparatively large inner diameter to the slits having a small width, and is extruded as a formed body (a formed honeycomb body) of the honeycomb structure from openings of the slits.

As the die base constituting such a die for forming the honeycomb structure, there is used a die base including a plate-like member made of one type of alloy such as a stainless alloy or a hard metal alloy, or there is used a die base which is constituted by laminating and bonding two different types of plate-like members, for example, a plate-like member where the slits are to be formed and a plate-like member where the back holes are to be formed (e.g., Patent Documents 1 and 2).

In a conventional method for manufacturing the die for forming the honeycomb structure, the above-mentioned slits and back holes are formed in such a die base by machine processing.

Patent Document 1: Japanese Patent Application Laid-Open No. 2000-326318

Patent Document 2: Japanese Patent Application Laid-Open No. 2003-285308

DISCLOSURE OF THE INVENTION

To obtain a die base constituted by bonding two different types of plate-like members as described above, one of the plate-like members is sometimes provided beforehand with back holes, and groove portions and the like having shapes corresponding to slits so that the portions smoothly move a forming material introduced from the back holes into the slits.

However, since a large residual stress is generated at a bonding surface between the plate-like members of the die base constituted by bonding two different types of plate-like members, the back holes and the groove portions formed beforehand at one of the plate-like members are deformed owing to the residual stress of the bonding surface. Therefore, a die for forming a honeycomb structure manufactured using such a die base has a problem that a forming precision is low.

Moreover, since the back holes and the groove portions deformed as described above generate a stress in a direction vertical to the bonding surface between the plate-like members, there is also a problem that the bonded plate-like members peel off.

The present invention has been developed in view of the above-mentioned problems, and an object thereof is to provide a die for forming a honeycomb structure and a method for manufacturing the same in which the honeycomb structure can precisely be formed.

The present invention provides the following die for forming the honeycomb structure and the following method for manufacturing the same.

[1] A die for forming a honeycomb structure comprising: a die base having a first plate-like member provided with back holes to introduce a forming material and a second plate-like member provided with slits to form the forming material into a lattice-like shape, the first plate-like member being provided with groove portions having shapes corresponding to the slits on the side of a bonding surface between the first plate-like member and the second plate-like member, the groove portions each having a depth y (mm) which satisfies the following equation (1):

$$y \leq a \cdot (t1 \times E1 + t2 \times E2)/(t1 \times t2 \times E1 \times E2) \qquad (1),$$

in which t1 is a thickness (mm) obtained by subtracting the depth (mm) of the groove portions from a thickness (mm) of the first plate-like member, E1 is an apparent volume elasticity (GPa) of the first plate-like member at 25° C. in consideration of a state in which the back holes are formed, t2 is a thickness (mm) of the second plate-like member, E2 is a volume elasticity (GPa) of the second plate-like member at 25° C., and a is a coefficient determined on the basis of thermal expansion coefficients of the first plate-like member and the second plate-like member, a temperature difference between a bonding temperature in a case where the first plate-like member is bonded to the second plate-like member and ordinary temperature, and a width and a pitch of the groove portions.

[2] The die for forming the honeycomb structure according to the above [1], wherein the second plate-like member is made of a tungsten-carbide-based hard alloy.

[3] The die for forming the honeycomb structure according to the above [1] or [2], wherein the first plate-like member is made of a metal or an alloy which causes at least one phase transformation selected from the group consisting of a martensitic transformation, a bainitic transformation and a pearlitic transformation by cooling of an austenite phase.

[4] A method for manufacturing a die for forming a honeycomb structure, in which the die for forming the honeycomb structure including a die base having a first plate-like member and a second plate-like member is manufactured, the first plate-like member being provided with back holes to introduce a forming material and the second plate-like member being provided with slits to form the forming material into a lattice-like shape, the method comprising the steps of: forming groove portions having shapes corresponding to the slits at one surface of the first plate-like member so that a depth y (mm) of the groove portions satisfies the following equation (2); and laminating the second plate-like member on the one surface of the first plate-like member to obtain the die base in which the first plate-like member is bonded to the second plate-like member:

$$y \leq a \cdot (t1 \times E1 + t2 \times E2)/(t1 \times t2 \times E1 \times E2) \qquad (2),$$

in which t1 is a thickness (mm) obtained by subtracting the depth (mm) of the groove portions from a thickness (mm) of the first plate-like member, E1 is an apparent volume elasticity (GPa) of the first plate-like member at 25° C. in consideration of a state in which the back holes are formed, t2 is a thickness (mm) of the second plate-like member, E2 is a volume elasticity (GPa) of the second plate-like member at 25° C., and a is a coefficient determined on the basis of thermal expansion coefficients of the first plate-like member and the second plate-like member, a temperature difference between a bonding temperature in a case where the first plate-like member is bonded to the second plate-like member and ordinary temperature, and a width and a pitch of the groove portions.

[5] The method for manufacturing the die for forming the honeycomb structure according to the above [4], wherein as the second plate-like member, a member made of a tungsten-carbide-based hard alloy is used.

[6] The method for manufacturing the die for forming the honeycomb structure according to the above [4] or [5], wherein as the first plate-like member, a member made of a metal or an alloy which causes at least one phase transformation selected from the group consisting of a martensitic transformation, a bainitic transformation and a pearlitic transformation by cooling of an austenite phase is used.

[7] The method for manufacturing the die for forming the honeycomb structure according to the above [6], wherein the laminated first and second plate-like members are heated at a temperature or more at which the first plate-like member causes an austenitic transformation to bond the first plate-like member to the second plate-like member.

[8] The method for manufacturing the die for forming the honeycomb structure according to the above [6] or [7], wherein a temperature of the resultant die base is lowered to a temperature at which the at least one phase transformation is started to cause the phase transformation of a metal structure or an alloy structure constituting the first plate-like member.

[9] The method for manufacturing the die for forming the honeycomb structure according to any one of the above [6] to [8], wherein a temperature of the bonded first and second plate-like members is lowered to a temperature at which the at least one phase transformation is started at a temperature drop rate of 0.1 to 100° C./min.

[10] The method for manufacturing the die for forming the honeycomb structure according to any one of the above [4] to [9], wherein at least a part of the back holes are formed at the first plate-like member before the first and second plate-like members are laminated.

According to the die for forming the honeycomb structure of the present invention, the honeycomb structure can precisely be formed, and peeling at the bonding surface between the plate-like members in the die base constituted by bonding the plate-like members can be reduced.

Moreover, according to the method for manufacturing the die for forming the honeycomb structure of the present invention, the above-mentioned die for forming the honeycomb structure of the present invention can simply be manufactured.

DESCRIPTION OF REFERENCE NUMERALS

1: a die for forming a honeycomb structure (a die), 5: slits, 6: back holes, 7: groove portions, 12: a honeycomb structure, 13: partition walls, 14: cells, 22: a die base, 23: a first plate-like member, 24: a second plate-like member, 27: a solder material, and 28: a bonding surface (a bonding surface between the first plate-like member and the second plate-like member).

BEST MODE FOR CARRYING OUT THE INVENTION

Embodiments of a die for forming a honeycomb structure (hereinafter sometimes referred to simply as the "die") and a method for manufacturing the same will hereinafter be described in detail with reference to the drawings, but the present invention is not limited to these embodiments when interpreted, and can variously be altered, modified and improved based on knowledge of a person skilled in the art without departing from the scope of the present invention.

Figure 1:
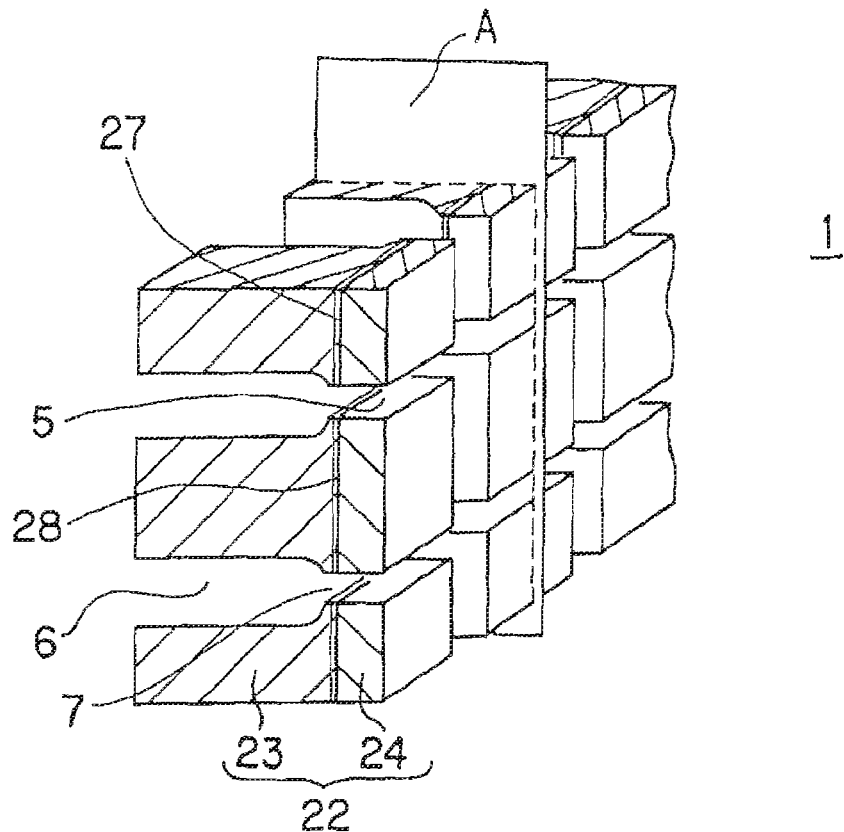
FIG. 1 is a perspective view schematically showing one embodiment of a die for forming a honeycomb structure of the present invention.

First, one embodiment of the die for forming the honeycomb structure of the present invention will specifically be described. FIG. 1 is a perspective view schematically showing one embodiment of the die for forming the honeycomb structure of the present invention, and FIG. 2 is a sectional view showing a section obtained by cutting the die shown in FIG. 1 along a plane A.

Figure 2:
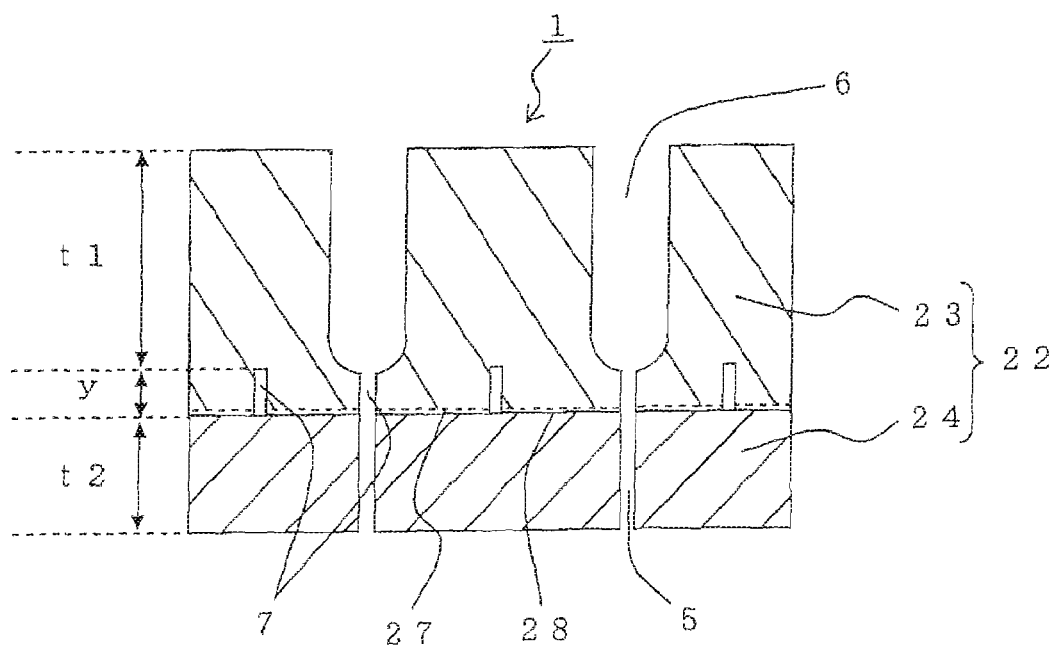
FIG. 2 is a sectional view showing a section obtained by cutting the die shown in FIG. 1 along a plane A.

As shown in FIGS. 1 and 2, a die 1 for forming the honeycomb structure of the present embodiment is a die 1 for forming the honeycomb structure including a die base 22 having a first plate-like member 23 provided with back holes 6 to introduce a forming material and a second plate-like member 24 provided with slits 5 to form this forming material into a lattice-like shape.

The die 1 for forming the honeycomb structure of this embodiment is provided with groove portions 7 having shapes corresponding to the slits 5 on the side of a bonding surface between the first plate-like member 23 and the second plate-like member 24, and a depth y (mm) of the groove portions satisfies the following equation (3):

$$y \leq a \cdot (t1 \times E1 + t2 \times E2)/(t1 \times t2 \times E1 \times E2) \qquad (3),$$

in which t1 is a thickness (mm) obtained by subtracting the depth (mm) of the groove portions 7 from a thickness (mm) of the first plate-like member 23, E1 is an apparent volume elasticity (GPa) of the first plate-like member 23 at 25° C. in consideration of a state in which the back holes 6 are formed, t2 is a thickness (mm) of the second plate-like member 24, E2 is a volume elasticity (GPa) of the second plate-like member 24 at 25° C., and a is a coefficient determined on the basis of thermal expansion coefficients of the first plate-like member 23 and the second plate-like member 24, a temperature difference between a bonding temperature in a case where the first plate-like member 23 is bonded to the second plate-like member 24 and ordinary temperature, and a width and a pitch of the groove portions.

As described above, when the depth y (mm) of the groove portions 7 satisfies the above equation (3), deformation and strain of the groove portions 7 due to a stress generated at a bonding surface 28 between the first plate-like member 23 and the second plate-like member 24 can be reduced to suppress generation of a stress in a direction vertical to the bonding surface 28. Therefore, the die 1 for forming the honeycomb structure of the present embodiment is capable of precisely forming the honeycomb structure. Moreover, in the die base 22 constituted by bonding the plate-like members, peeling at the bonding surface 28 between the first plate-like member 23 and the second plate-like member 24 can be reduced.

It is to be noted that the apparent volume elasticity E1 (GPa) of the first plate-like member 23 at 25° C. in consideration of the state in which the back holes 6 are formed can easily be obtained by using, for example, finite element (FEM) simulation of the first plate-like member 23 provided with the back holes 6.

It is to be noted that the above-mentioned coefficient a is a coefficient determined on the basis of the thermal expansion coefficients of the first plate-like member 23 and the second plate-like member 24, a temperature difference between a bonding temperature in a case where the first plate-like member 23 is bonded to the second plate-like member 24 and ordinary temperature, and a width and a pitch of the groove portions, and can be calculated by the following equation (4):

$$a = k \times \Delta T \times (1 - \alpha 2/\alpha 1) \times (L - M) \quad (4),$$

in which α1 is a thermal expansion coefficient (1/° C.) of the first plate-like member 23, α2 is a thermal expansion coefficient (1/° C.) of the second plate-like member 24, ΔT is a temperature difference (° C.) between the bonding temperature in a case where the first plate-like member 23 is bonded to the second plate-like member 24 and ordinary temperature, M is a width (mm) of the groove portions 7, L is a pitch (mm) of the groove portions 7, and k is an affinity between the first plate-like member 23 and the second plate-like member 24 when bonded (hereinafter sometimes referred to simply as the "affinity k during the bonding").

The above-mentioned affinity k during the bonding is a numerical value indicating a bonding strength, and can be obtained from an experimental result in a case where the first plate-like member 23 and the second plate-like member 24 are actually bonded. For example, when stainless steel is used as the first plate-like member 23 and a super hard alloy is used as the second plate-like member 24, the thermal expansion coefficient α1 of the first plate-like member is $11.5 \times 10^{-6}$ (1/° C.), and the thermal expansion coefficient α2 of the second plate-like member is $6.3 \times 10^{-6}$ (1/° C.). Assuming that the temperature difference ΔT between the bonding temperature in a case where the first plate-like member 23 and the second plate-like member 24 are bonded and the ordinary temperature is 1100° C., the width M of the groove portions 7 is 0.3 mm and the pitch L of the groove portions 7 is 1.0 mm, the affinity k during the bonding is 1.75, and the coefficient a is about 610.

Figure 3:
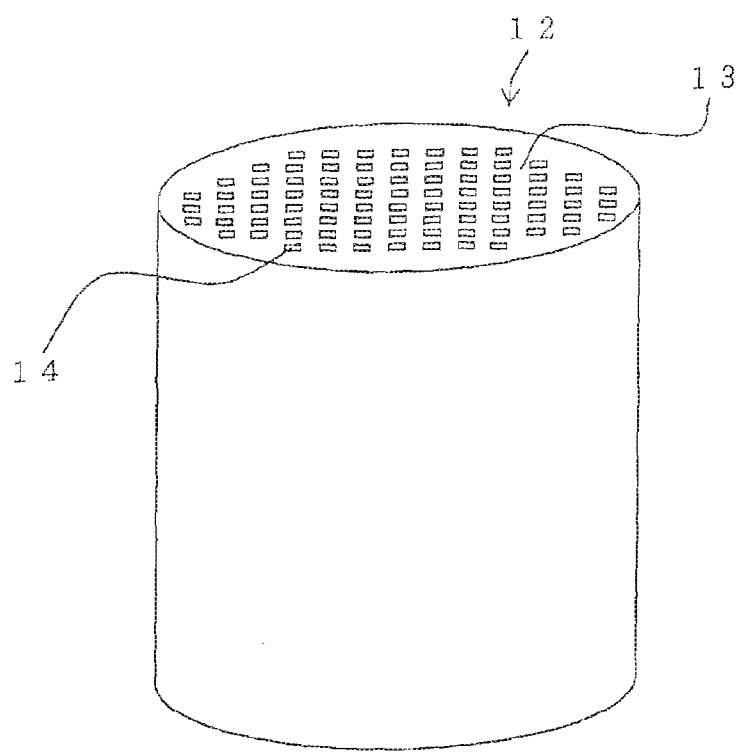
FIG. 3 is a perspective view showing a honeycomb structure extruded with the die shown in FIG. 1.

For example, as shown in FIG. 3, the die 1 for forming the honeycomb structure of the present embodiment is a die for extruding a honeycomb structure 12 including porous partition walls 13, and a plurality of cells 14 constituting channels of a fluid and separated from each other by the partition walls 13. It is to be noted that the honeycomb structure 12 shown in FIG. 3 is preferably usable in an internal combustion engine, a boiler, a carrier for catalyst using a catalyst function of a chemical reaction device, a reformer for a fuel cell and the like, a trapping filter of fine particles included in an exhaust gas and the like.

The slits 5 of the die 1 for forming the honeycomb structure shown in FIGS. 1 and 2 form portions of the partition walls 13 of the honeycomb structure 12 shown in FIG. 3, and the slits are formed into lattice-like shapes in accordance with shapes of the partition walls 13 as shown in FIG. 1.

Moreover, the back holes 6 are arranged so as to introduce the forming material, and there is not any special restriction on shapes of the back holes 6 as long as the introduced forming material can be guided into the slits 5, but as shown in FIGS. 1 and 2, it is preferable to form the back holes at positions where the back holes communicate with intersections of the slits 5 of the die 1 for forming the honeycomb structure. According to this constitution, in a case where the extrusion is performed using the die 1 for forming the honeycomb structure of the present embodiment, the forming material introduced into the back holes 6 can uniformly be spread over the whole slits 5, and high formability can be realized.

It is to be noted that a size or the like of an opening diameter of the back holes 6 can appropriately be determined on the basis of a size of the die 1 for forming the honeycomb structure, a shape of the honeycomb structure 12 (see FIG. 3) to be extruded and the like. However, it is preferable that the size of the opening diameter of the back holes 6 is 10 to 0.1 mm, and it is further preferable that the size is 3 to 0.5 mm. The back holes 6 can be formed by a heretofore known method such as electrochemical machine processing (ECM processing), electric discharge machine processing (EDM processing), laser processing or mechanical processing, for example, drilling.

Moreover, the groove portions 7 formed at the first plate-like member 23 on the side of the bonding surface 28 function as buffer portions which guide the forming material introduced from the back holes 6 into the slits 5. Since the groove portions 7 are formed, the forming material introduced from the back holes 6 can smoothly be moved without any trouble, and the honeycomb structure can precisely be formed in a case where the honeycomb structure is extruded.

Furthermore, in the die 1 for forming the honeycomb structure of the present embodiment, there is not any special restriction on the first plate-like member 23, but it is preferable that the first plate-like member is made of a metal or an alloy which can cause at least one phase transformation selected from the group consisting of a martensitic transformation, a bainitic transformation and a pearlitic transformation by cooling of an austenite phase.

Examples of such a metal or alloy constituting the first plate-like member 23 include a metal or an alloy containing at least one metal selected from the group consisting of iron (Fe), titanium (Ti), nickel (Ni), copper (Cu) and aluminum (Al). The metal or alloy constituting the first plate-like member 23 may further contain an additive such as carbon (C), silicon (Si), chromium (Cr), manganese (Mn), molybdenum (Mo), platinum (Pt) or palladium (Pd).

Preferable examples of such an alloy constituting the first plate-like member 23 include stainless alloys such as SUS630 (C; 0.07 or less, Si; 1.00 or less, Mn; 1.00 or less, P; 0.040 or less, S; 0.030 or less, Ni; 3.00 to 5.00, Cr; 15.50 to 17.50, Cu; 3.00 to 5.00, Nb+Ta; 0.15 to 0.45 and Fe; a remaining part (unit is mass %)). Such a stainless alloy is comparatively easily mechanically processed to form the back holes 6, and is an inexpensive material.

Moreover, in the die 1 for forming the honeycomb structure of the present embodiment, it is preferable that the second plate-like member 24 is made of a tungsten-carbide-based hard alloy.

It is preferable that the tungsten-carbide-based hard alloy is an alloy containing at least tungsten carbide and obtained by sintering tungsten carbide with at least one metal selected from the group consisting of iron (Fe), cobalt (Co), nickel (Ni), titanium (Ti) and chromium (Cr). The tungsten-carbide-based hard alloy in which at least one metal selected from the above group is used as a bonding agent in this manner especially has excellent resistance to wear and mechanical strength. Examples of such a tungsten-carbide-based hard alloy include a tungsten-carbide-based hard alloy in which, for example, cobalt (Co) is used as the bonding agent. Specific examples of the alloy include an alloy such as WC—Co (a Co containing ratio of 0.1 to 50 mass %).

There is not any special restriction on thicknesses of the first plate-like member 23 and second plate-like member 24, but the thicknesses can appropriately be determined in consideration of general shapes of the slits 5 and the back holes 6 so that a residual stress at the bonding surface 28 between the first plate-like member 23 and the second plate-like member 24 can effectively be reduced. For example, in a case where the general die 1 for forming the honeycomb structure is manufactured, a ratio of the thickness of the first plate-like member 23 with respect to that of the second plate-like member 24 is preferably 0.1 to 200, further preferably 1 to 10.

Moreover, in the die 1 for forming the honeycomb structure of the present embodiment, a solder material 27 may be disposed between the first plate-like member 23 and the second plate-like member 24.

As the solder material 27, a heretofore known solder material for use in a case where two different types of metals or alloys are bonded may be used.

It is to be noted that there is not any special restriction on the solder material 27 for use in the die 1 for forming the honeycomb structure of the present embodiment, but it is preferable that the solder material is constituted of a material which can permeate the metal or the alloy constituting the first plate-like member 23. When the solder material 27 constituted of such a material is used, the solder material 27 permeates a structure of the first plate-like member 23, and the solder material 27 does not exist as a single layer. In consequence, a drop of the mechanical strength of the die 1 for forming the honeycomb structure can effectively be prevented. When the solder material 27 permeates the structure of the first plate-like member 23, any solder material 27 is not present at the bonding surface 28 between the first plate-like member 23 and the second plate-like member 24. In consequence, corrosion and wear from the solder material 27 can effectively be prevented.

Specific examples of the solder material 27 include the solder material 27 made of the metal or the alloy containing at least one selected from the group consisting of copper (Cu), silver (Ag), gold (Au), nickel (Ni) and aluminum (Al). It is to be noted that copper (Cu) or the alloy containing copper (Cu) has high permeability with respect to the stainless alloy preferably usable as the first plate-like member 23, and can therefore especially preferably be used.

Moreover, the solder material 27 may further contain an additive such as palladium (Pd), silicon (Si), tin (Sn), cobalt (Co), phosphor (P), manganese (Mn), zinc (Zn) or boron (B). The material further containing such an additive can improve bonding reliability.

Figure 4:
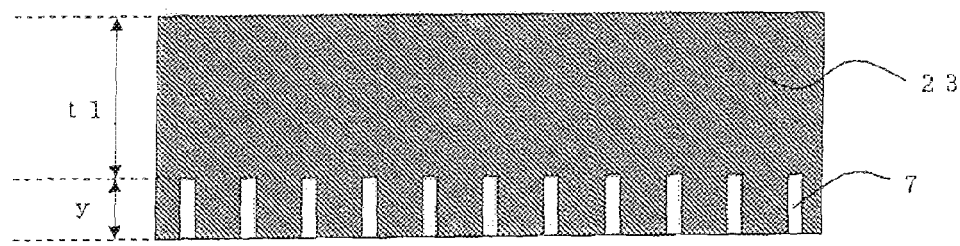
FIG. 4 is an explanatory view showing one example of a step of forming groove portions at a first plate-like member according to one embodiment of a method for manufacturing the die for forming the honeycomb structure of the present invention, and showing a section similar to that of FIG. 2.
Figure 5:
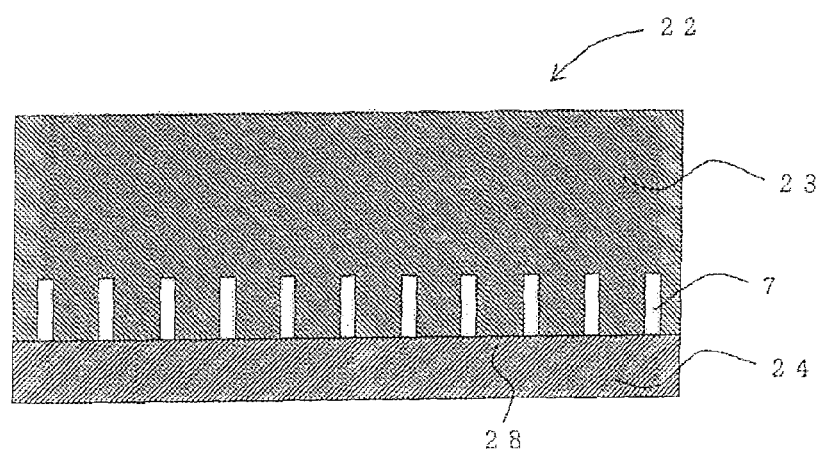
FIG. 5 is an explanatory view showing one example of a step of laminating the first plate-like member and a second plate-like member according to one embodiment of the method for manufacturing the die for forming the honeycomb structure of the present invention, and showing a section similar to that of FIG. 2.
Figure 6:
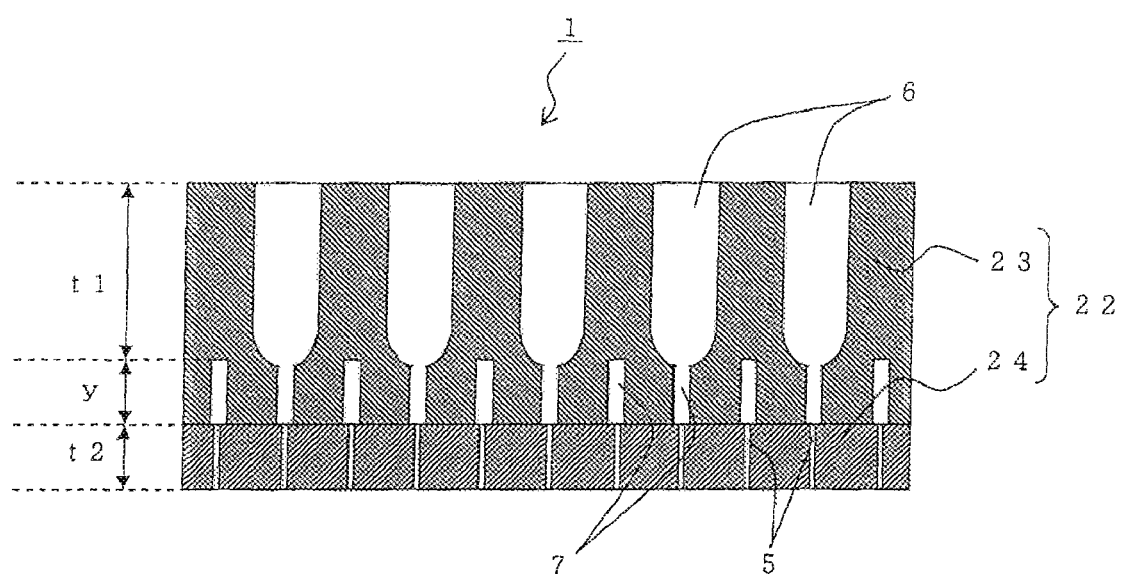
FIG. 6 is an explanatory view showing one example of a step of forming slits at the second plate-like member according to one embodiment of the method for manufacturing the die for forming the honeycomb structure of the present invention, and showing a section similar to that of FIG. 2.

Next, one embodiment of a method for manufacturing a die for forming a honeycomb structure according to the present invention will specifically be described. The method for manufacturing the die for forming the honeycomb structure according to the present embodiment is a method for manufacturing one embodiment (the die 1 for forming the honeycomb structure) of the die for forming the honeycomb structure according to the present invention shown in FIGS. 1 and 2. Here, FIGS. 4 to 6 are explanatory views showing steps of the method for manufacturing the die for forming the honeycomb structure according to the present embodiment. It is to be noted that FIGS. 4 to 6 show sections similar to the section of FIG. 2.

The method for manufacturing the die for forming the honeycomb structure according to the present embodiment is, as shown in FIGS. 1 and 2, a method for manufacturing the die 1 for forming the honeycomb structure including the die base 22 having the first plate-like member 23 and the second plate-like member 24, the first plate-like member 23 being provided with the back holes 6 for introducing the forming material and the second plate-like member 24 being provided with the slits 5 for forming the forming material into the lattice-like shape. The method comprises the steps of: forming the groove portions 7 having the shapes corresponding to the slits 5 (see FIG. 2) at one surface of the first plate-like member 23, as shown in FIG. 4, so that a depth y (mm) of the groove portions 7 satisfies the following equation (5); and laminating the second plate-like member 24 on the one surface of the first plate-like member 23, as shown in FIG. 5, to obtain the die base 22 in which the first plate-like member 23 is bonded to the second plate-like member 24:

$$y \leq a \cdot (t1 \times E1 + t2 \times E2)/(t1 \times t2 \times E1 \times E2) \tag{5},$$

in which t1 is a thickness (mm) obtained by subtracting the depth (mm) of the groove portions 7 from the thickness (mm) of the first plate-like member 23, E1 is the apparent volume elasticity (GPa) of the first plate-like member 23 at 25° C. in consideration of the state in which the back holes 6 are formed, t2 is the thickness (mm) of the second plate-like member 24, E2 is the volume elasticity (GPa) of the second plate-like member 24 at 25° C., and a is the coefficient determined on the basis of the thermal expansion coefficients of the first plate-like member 23 and the second plate-like member 24, the temperature difference between the bonding temperature in the case where the first plate-like member 23 is bonded to the second plate-like member 24 and the ordinary temperature, and the width and the pitch of the groove portions 7.

It is to be noted that the above coefficient a can be calculated by the above equation (4) described in the embodiment of the die for forming the honeycomb structure according to the present invention. For example, when stainless steel is used as the first plate-like member 23 and a super hard alloy is used as the second plate-like member 24, the thermal expansion coefficient $\alpha 1$ of the first plate-like member 23 is $11.5 \times 10^{-6}$ (1/° C.), and the thermal expansion coefficient $\alpha 2$ of the second plate-like member 24 is $6.3 \times 10^{-6}$ (1/° C.). Assuming that the temperature difference $\Delta T$ between the bonding temperature in the case where the first plate-like member 23 and the second plate-like member 24 are bonded and the ordinary temperature is 1100° C., the width M of the groove portions 7 is 0.3 mm and the pitch L of the groove portions 7 is 1.0 mm, the above-mentioned affinity k during the bonding is 1.75, and the coefficient a is about 610.

According to such a constitution, the die 1 for forming the honeycomb structure shown in FIGS. 1 and 2 can simply be manufactured. The method for manufacturing the die for forming the honeycomb structure according to the present embodiment will hereinafter be described further specifically in accordance with the steps.

First, as shown in FIG. 4, one surface of the first plate-like member 23 is provided with the groove portions 7 having the shapes corresponding to the slits 5 (see FIG. 2) so that the depth y (mm) of the groove portions 7 satisfies the above equation (5).

The first plate-like member 23 mainly constitutes portions of the die base 22 (see FIG. 1) provided with the back holes 6, and a member made of a heretofore known metal or alloy for use in the die for forming the honeycomb structure may be used. Especially, in the method for manufacturing the die for forming the honeycomb structure according to the present embodiment, as described in one embodiment of the die for forming the honeycomb structure of the present invention, the first plate-like member made of the metal or the alloy which can cause at least one phase transformation selected from the group consisting of the martensitic transformation, the bainitic transformation and the pearlitic transformation by the cooling of the austenite phase may preferably be used.

Examples of such a metal or alloy include a metal or alloy containing at least one metal selected from the group consisting of iron (Fe), titanium (Ti), nickel (Ni), copper (Cu) and aluminum (Al). It is to be noted that it is further preferable that such a metal or alloy constituting the first plate-like member 23 may contain an additive such as carbon (C), silicon (Si), chromium (Cr), manganese (Mn), molybdenum (Mo), platinum (Pt) or palladium (Pd).

More specifically, preferable examples of the alloy constituting the first plate-like member 23 include stainless alloys such as SUS630 (C; 0.07 or less, Si; 1.00 or less, Mn; 1.00 or less, P; 0.040 or less, S; 0.030 or less, Ni; 3.00 to 5.00, Cr; 15.50 to 17.50, Cu; 3.00 to 5.00, Nb+Ta; 0.15 to 0.45 and Fe; a remaining part (the unit is mass %)). Such a stainless alloy is comparatively easily mechanically processed to form the back holes 6, and is an inexpensive material.

As a method for forming the groove portions 7, a heretofore known method such as grind processing with a diamond grindstone or electric discharge machine processing (EDM processing) may preferably be used.

Moreover, in the method for manufacturing the die for forming the honeycomb structure according to the present embodiment, before or after the groove portions 7 are formed at one surface of the first plate-like member 23, the back holes 6 (see FIG. 2) which communicate with the groove portions 7 from the other surface of the first plate-like member 23 may be formed. It is to be noted that after the first plate-like member 23 and the second plate-like member 24 are bonded, the back holes 6 (see FIG. 2) may be formed. FIG. 5 shows a case where the only groove portions 7 are formed.

There is not any special restriction on a method for forming the back holes 6, but a heretofore known method such as electrochemical machine processing (ECM processing), electric discharge machine processing (EDM processing), laser processing and machine processing, for example, drilling may preferably be used.

It is to be noted that when the depth y (mm) of the groove portions 7 does not satisfy the above equation (5), that is, the depth is in excess of a value of $a \cdot (t1 \times E1 + t2 \times E2)/(t1 \times t2 \times E1 \times E2)$, the groove portions 7 are largely deformed owing to a thermal stress generated at the bonding surface between the first plate-like member 23 and the second plate-like member 24.

Next, as shown in FIG. 5, the second plate-like member 24 is laminated on one surface of the first plate-like member 23 provided with the groove portions 7 to obtain the die base 22 in which the first plate-like member 23 and the second plate-like member 24 are bonded. This second plate-like member 24 mainly constitutes portions of the die base 22 (see FIG. 1) provided with the slits 5 (see FIG. 1), and a member made of a tungsten-carbide-based hard alloy may preferably be used.

It is preferable that the tungsten-carbide-based hard alloy is an alloy containing at least tungsten carbide and obtained by sintering tungsten carbide with at least one metal selected from the group consisting of iron (Fe), cobalt (Co), nickel (Ni), titanium (Ti) and chromium (Cr). The tungsten-carbide-based hard alloy in which at least one metal selected from the above group is used as the bonding agent in this manner especially has excellent resistance to wear and mechanical strength. Examples of such a tungsten-carbide-based hard alloy include a tungsten-carbide-based hard alloy in which, for example, cobalt (Co) is used as the bonding agent. Specific examples of the alloy include an alloy such as WC—Co (a Co containing ratio of 0.1 to 50 mass %).

Moreover, in the method for manufacturing the die for forming the honeycomb structure according to the present embodiment, when the second plate-like member 24 is laminated on one surface of the first plate-like member 23, a solder material may be disposed between the first plate-like member 23 and the second plate-like member 24 to bond the members. As such a solder material, the solder material described in one embodiment of the die for forming the honeycomb structure according to the present invention may preferably be used.

When the first plate-like member 23 and the second plate-like member 24 are laminated and bonded, it is preferable that the first plate-like member 23 and the second plate-like member 24 are heated at a temperature or more at which the first plate-like member 23 causes an austenitic transformation to bond the members. According to such a constitution, the first plate-like member 23 and the second plate-like member 24 may satisfactorily be bonded.

Moreover, in the method for manufacturing the die for forming the honeycomb structure according to the present embodiment, a temperature of the resultant die base 22 may be lowered to a temperature at which the at least one phase transformation is started to cause the phase transformation of a metal structure or an alloy structure constituting the first plate-like member 23. When the first plate-like member 23 is subjected to the phase transformation in this manner, a dimension of the first plate-like member 23 can be changed, and the residual stress at the bonding surface 28 between the first plate-like member 23 and the second plate-like member 24 can be reduced. Specifically, it is preferable to set the residual stress at the bonding surface 28 to 1000 MPa or less.

The above-mentioned residual stress (hereinafter sometimes referred to simply as the "residual stress at the bonding surface 28") at the bonding surface 28 between the first plate-like member 23 and the second plate-like member 24 is a tensile stress or a compressive stress remaining on the bonding surface 28, and can be measured using, for example, an X-ray stress measurement device or the like. In a specific example of a measurement method, first the surface of an object (the die base 22) to be tested is irradiated with a characteristic X-ray, and a reflected diffraction ray is measured. Subsequently, it is assumed that the stress of the surface of the object (the die base 22) to be tested is a two-dimensional stress constituted of components parallel to the surface of the object. Based on a measurement result of the resultant reflected diffraction ray, the above residual stress can be calculated using formulas of elastic dynamics.

It is to be noted that preferable examples of a method of measuring the reflected diffraction ray include a film process and a counter tube process. Such a method is described in, for example, "X-Ray Stress Measurement Method" edited by the Society of Materials Science, Japan and published by Yokensha, 1981. The residual stress at the bonding surface 28 may be measured by, for example, processing grooves at the die base 22 and measuring a change amount of warpage in this case without using the X-ray stress measurement device.

Since a ratio of change of the dimension of the first plate-like member 23 depends on a temperature drop rate during the phase transformation, the temperature drop rate is adjusted so that a dimensional change of the first plate-like member 23 comes close to that of the second plate-like member 24, and the residual stress at the bonding surface 28 between the first plate-like member 23 and the second plate-like member 24 is reduced.

In the method for manufacturing the die for forming the honeycomb structure according to the present embodiment, it is preferable that a temperature of the bonded first plate-like member 23 and second plate-like member 24 is lowered to a temperature at which the at least one phase transformation is started at a temperature drop rate of 0.1 to 100° C./min.

Moreover, the dimensional change of the first plate-like member 23 does not depend on the only temperature drop rate during the phase transformation, and is also influenced by, for example, the components of the alloy constituting the first plate-like member 23. Therefore, the components of the alloy constituting the first plate-like member 23 can be regulated to control the dimensional change of the first plate-like member 23. Examples of a method of regulating the components of the alloy constituting the first plate-like member 23 include a method of adding a predetermined element to the alloy constituting the first plate-like member 23.

After the die base 22 is obtained in this manner, as shown in FIG. 6, the slits 5 and the back holes 6 are formed in the die base 22 to manufacture the die 1 for forming the honeycomb structure. It is to be noted that in a case where the first plate-like member 23 is beforehand provided with the back holes 6, the only slits 5 may be formed.

There is not any special restriction on a method of forming the slits 5, and a heretofore known method such as the grind processing with the diamond grindstone or the electric discharge machine processing (EDM processing) may preferably be used. Moreover, in the die 1 for forming the honeycomb structure shown in FIG. 1, the slits 5 have quadrangular-lattice-like shapes, but in the method for manufacturing the die for forming the honeycomb structure according to the present embodiment, the shapes of the slits 5 formed in the second plate-like member 24 are not limited to the quadrangular-lattice-like shapes, and may be another polygonal-lattice-like shape.

Moreover, the width of the slits 5 formed in the second plate-like member 24 can appropriately be determined on the basis of a shape of the honeycomb structure 12 (see FIG. 3) to be formed. It is to be noted that, for example, in order to manufacture the die 1 for extruding and forming the general honeycomb structure, it is preferable that the width of the slits 5 is 5 to 5000 μm, and it is further preferable that the width is 10 to 500 μm.

As described above, as shown in FIGS. 1 and 2, the die 1 for forming the honeycomb structure can be manufactured in which the back holes 6 for introducing the forming material and the slits 5 for forming the forming material into the lattice-like shape are formed.

EXAMPLES

The present invention will hereinafter be described more specifically in accordance with examples, but the present invention is not limited to the following examples.

Example 1

A die for forming a honeycomb structure was manufactured in which back holes to introduce a forming material and slits to form a forming material into a lattice-like shape were formed and in which the forming material introduced into the back holes was extruded from the slits to form the honeycomb structure.

In Example 1, the die for forming the honeycomb structure was manufactured using a first plate-like member made of SUS630 (C; 0.07 or less, Si; 1.00 or less, Mn; 1.00 or less, P; 0.040 or less, S; 0.030 or less, Ni; 3.00 to 5.00, Cr; 15.50 to 17.50, Cu; 3.00 to 5.00, Nb+Ta; 0.15 to 0.45 and Fe; a remaining part (the unit is mass %)), a second plate-like member made of a tungsten-carbide-based hard alloy of WC-16 mass % Co and a solder material made of copper.

The first plate-like member had a square surface having a size of 80 mm×80 mm, and a thickness of 12.5 mm, the second plate-like member had a square surface having a size of 80 mm×80 mm, and a thickness of 2.5 mm, and the solder material had a square surface having a size of 80 mm×80 mm, and a thickness of 0.01 mm.

First, the first plate-like member was provided with lattice-like groove portions having a depth of 1.0 (mm) and back holes having an opening diameter of about 1 mm by electro-chemical machine processing (ECM processing). It is to be noted that a width of the groove portions was set to 0.3 mm, and a pitch of the groove portions was set to 1.0 mm. An apparent volume elasticity E1 at 25° C. in consideration of a state in which the back holes of the first plate-like member were formed was 50 GPa, and a volume elasticity E2 of the second plate-like member at 25° C. was 500 GPa. Furthermore, a thermal expansion coefficient of the first plate-like member was $11.5 \times 10^{-6}$ (1/° C.), and a thermal expansion coefficient of the second plate-like member was $6.3 \times 10^{-6}$ (1/° C.).

Subsequently, after the solder material was disposed and laminated between the first plate-like member and the second plate-like member, the first plate-like member and the second plate-like member were heated at 1120° C. and bonded to obtain a die base. It is to be noted that ordinary temperature during the bonding was 20° C., and a temperature difference ΔT between the bonding temperature in the case where the first plate-like member and the second plate-like member were bonded and the ordinary temperature was 1100° C. Moreover, an affinity k during the bonding was 1.75, and a coefficient a in the above equation (1) was 610.

After a temperature of the resultant die base was lowered to the ordinary temperature, the slits were formed at the second plate-like member to obtain the die for forming the honeycomb structure. The slits were formed into quadrangular-lattice-like shapes with a diamond grindstone. A width of the slits was set to about 0.1 mm, a depth of the slits was set to about 2.5 mm, and a space between the adjacent slits was set to about 1.0 mm.

With regard to the resultant die for forming the honeycomb structure, degrees of deformation of the groove portions formed at the first plate-like member and peeling of a bonding surface were evaluated. To evaluate the deformation of the groove portions, the deformation of the groove portions was judged to be "small" in a case where the deformation did not raise any problem during use as the die, and the deformation of the groove portions was judged to be "large" in a case where it was difficult to use the die. The peeling of the bonding surface was confirmed with an ultrasonic scanning video device. The honeycomb structure was extruded using the resultant die for forming the honeycomb structure, and formability was evaluated. Table 1 shows a thickness t1 (mm) obtained by subtracting a depth (mm) of the groove portions from a thickness (mm) of the first plate-like member, an apparent volume elasticity E1 (GPa) of the first plate-like member at 25° C. in consideration of a state in which the back holes are formed, a thickness t2 (mm) of the second plate-like member, a volume elasticity E2 (GPa) of the second plate-like member at 25° C., and evaluation results of the resultant die for forming the honeycomb structure.

structure of Example 1, any peel of a bonding surface was not seen, and formability was further satisfactory.

Comparative Examples 1 to 3

Dies for forming honeycomb structures were manufactured using a material similar to that of Example 1 by a method similar to that of Example 1 except that a thickness of a first plate-like member was set to 14.5 mm in Comparative Example 1, 18 mm in Comparative Example 2 and 14.5 mm in Comparative Example 3 and that a depth of groove portions was set to 3.0 mm in Comparative Examples 1 and 2 and 1.5 mm in Comparative Example 3.

In the resultant die for forming the honeycomb structure, the depth (mm) of the groove portions was in excess of a range of the above equation (1), deformation of the groove portions was large, a stress was generated in a direction vertical to a bonding surface between the first plate-like member and a second plate-like member, and peeling was generated at the

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Depth y (mm) of groove portions | 1.5 | 1.5 | 1.0 | 1.0 | 1.0 | 3.0 | 3.0 | 1.5 |
| t1 (mm) | 11.0 | 12.0 | 12.0 | 13.0 | 16.5 | 11.5 | 15.0 | 13.0 |
| t2 (mm) | 2.5 | 2.5 | 2.5 | 2.5 | 2.5 | 2.5 | 2.5 | 2.5 |
| E1 (GPa) | 50 | 50 | 50 | 50 | 50 | 50 | 50 | 50 |
| E2 (GPa) | 500 | 500 | 500 | 500 | 500 | 500 | 500 | 500 |
| Width (mm) of groove portions | 0.3 | 0.3 | 0.3 | 0.3 | 0.3 | 0.3 | 0.3 | 0.3 |
| Pitch (mm) of groove portions | 1.0 | 1.0 | 1.0 | 1.0 | 1.0 | 1.0 | 1.0 | 1.0 |
| Deformation of groove portions | Small | Small | Small | Small | Small | Large | Large | Large |
| Peeling of bonding surface | None | None | None | None | None | Present | Present | Present |
| Formability | Satisfactory | Satisfactory | Satisfactory | Satisfactory | Satisfactory | Defective | Defective | Defective |

In the die for forming the honeycomb structure of the present example, the depth (mm) of the groove portions satisfied the above equation (1), the deformation of the groove portions was satisfactorily suppressed, and the deformation was small to such an extent that any problem was not caused during the forming of the honeycomb structure. Generation of a stress in a direction vertical to the bonding surface between the first plate-like member and the second plate-like member was also suppressed, and any peel of the bonding surface between the first plate-like member and the second plate-like member was not confirmed. This die for forming the honeycomb structure had satisfactory formability, and the honeycomb structure could precisely be formed.

Examples 2 to 5

Dies for forming honeycomb structures were manufactured using a material similar to that of Example 1 by a method similar to that of Example 1 except that a thickness of a first plate-like member was set to 13.5 mm in Example 2, 13 mm in Example 3, 14 mm in Example 4 and 17.5 mm in Example 5 and that a depth (mm) of groove portions was set to 1.5 mm in Example 2 and 1.0 mm in Examples 3 to 5.

In the resultant dies for forming the honeycomb structures, the depth (mm) of the groove portions satisfied the above equation (1), deformation of the groove portions was small in the same manner as in the die for forming the honeycomb bonding surface. Moreover, since the deformation of the groove portions and the peeling of the bonding surface were generated, defects and the like were sometimes generated in the formed honeycomb structure.

INDUSTRIAL APPLICABILITY

A die for forming a honeycomb structure of the present invention is usable in an internal combustion engine, a boiler, a carrier for catalyst using a catalyst function of a chemical reaction device, a reformer for a fuel cell and the like, a trapping filter of fine particles included in an exhaust gas and the like. Moreover, a method for manufacturing the die for forming the honeycomb structure of the present invention, the above die for forming the honeycomb structure can simply be manufactured.

The invention claimed is:

1. A die for forming a honeycomb structure comprising:
a die base having a first plate-like member provided with back holes to introduce a forming material and a second plate-like member provided with slits to form the forming material into a lattice-like shape,
the first plate-like member being provided with groove portions having shapes corresponding to the slits on the side of a bonding surface between the first plate-like member and the second plate-like member,
the groove portions each having a depth y (mm) which satisfies the following equation (1)

$$y \leq a \cdot (t1 \times E1 + t2 \times E2)/(t1 \times t2 \times E1 \times E2) \quad (1),$$

in which t1 is a thickness (mm) obtained by subtracting the depth (mm) of the groove portions from a thickness (mm) of the first plate-like member, E1 is an apparent volume elasticity (GPa) of the first plate-like member at 25° C. in consideration of a state in which the back holes are formed, t2 is a thickness (mm) of the second plate-like member, E2 is a volume elasticity (GPa) of the second plate-like member at 25° C., and a is a coefficient calculated using the formula:

$$a = k * \Delta T * (1 - \alpha 2/\alpha 1) * (L-M),$$

where k is a numerical value indicating bonding strength, α1 and α2 are the thermal expansion coefficients (1/° C.) of the first plate-like member and the second plate-like member, respectively, ΔT is a temperature difference between a bonding temperature (° C.) in a case where the first plate-like member is bonded to the second plate-like member and ordinary temperature (° C.), and M and L are a width (mm) and a pitch (mm) of the groove portions respectively.

2. The die for forming the honeycomb structure according to claim 1, wherein the second plate-like member is made of a tungsten-carbide-based hard alloy.

3. The die for forming the honeycomb structure according to claim 1, wherein the first plate-like member is made of a metal or an alloy which causes at least one phase transformation selected from the group consisting of a martensitic transformation, a bainitic transformation and a pearlitic transformation by cooling of an austenite phase.

* * * * *